June 28, 1927.
J. J. COSIN
1,634,175
POWDER PUFF
Filed Sept. 11, 1925
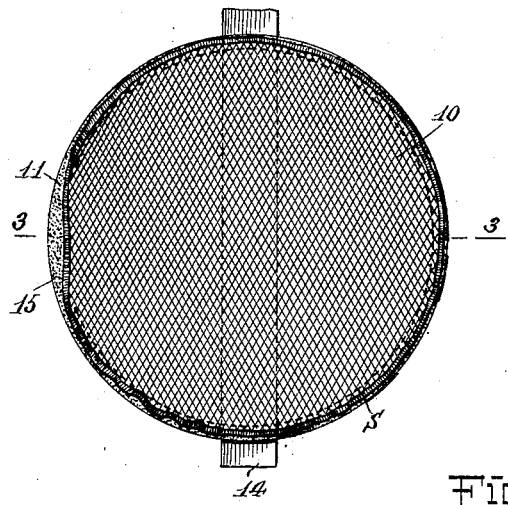
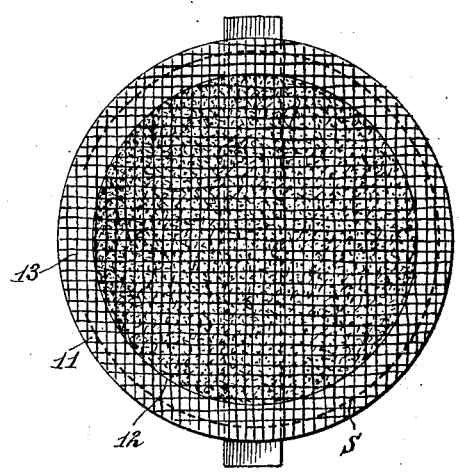
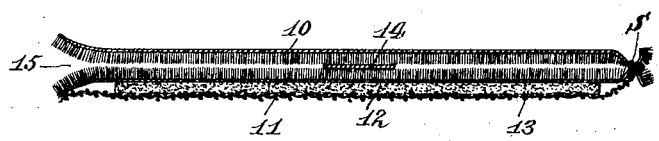
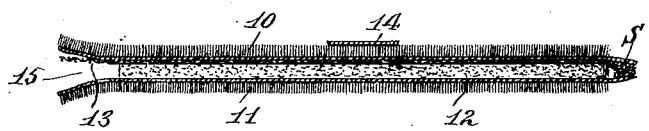
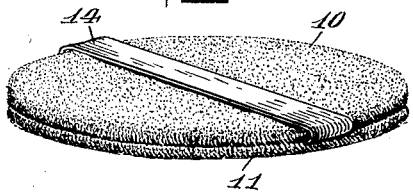
WITNESSES
William P. Goebel.
Chris Feinle.
INVENTOR
Joseph J. Cosin
BY
ATTORNEYS Patented June 28, 1927.

1,634,175

UNITED STATES PATENT OFFICE.

JOSEPH J. COSIN, OF BROOKLYN, NEW YORK.

POWDER PUFF.

Application filed September 11, 1925. Serial No. 55,857.

This invention relates to powder puffs.

Powder puffs hitherto produced have been found to be faulty in that the filler or wadding, as the filler is sometimes called, as incorporated in the powder puff makes the powder puff bulky at the marginal edge thereof. It is customary to make a powder puff of two plies of material such as pile fabric by stitching two plies of the same size and shape along their marginal edges with the pile of the plies confronting each other, with the filler piece also stitched in the same operation to the said plies disposed adjacent one of the plies. The two plies and the filler piece are stitched almost completely around the marginal edges thereof and at one point the plies are not stitched so that the powder puff which is thus produced may be turned inside out which produces a seam substantially completely around the marginal edge of the powder puff with portions of the plies overlapping each other. Such seam, therefore, produces a comparatively greater thickness at the marginal edge of the powder puff than at the center of the powder puff and as a result the powder puff is caved in at the middle, and has also been found to wrinkle due to the manner in which the filler ply is incorporated, and said filler ply has been found to bunch up at one side of the powder puff.

It is, therefore, the principal object of the present invention to produce a powder puff which will include a filler of any suitable material retained in place between the walls of the powder puff, itself unstitched, which will hold the walls of the powder puff against caving in or from in any way being uneven or irregular, which will give the desired rigidity and yet be sufficiently flexible, and which will eliminate the bulkiness at the marginal edge of the powder puff.

The nature of the invention and its distinguishing features and advantages will appear when the following specification is read in conjunction with the accompanying drawing in which—

Figure 1 is an elevation showing one side of the powder puff as it appears before it is turned inside out;

Fig. 2 is a view similar to that shown in Fig. 1 but showing the opposite side of the powder puff;

Fig. 3 is a cross-section taken substantially on the line 3—3 of Fig. 1;

Fig. 4 is a view similar to that shown in Fig. 3 but showing the powder puff turned inside out with the right sides out; and Fig. 5 is a perspective view of the finished powder puff embodying the present invention.

In accordance with the present invention use is made of two plies 10 and 11 of pile fabric, or any other suitable preferred material. The two plies 10 and 11 are identical in shape and size and are laid together with the pile of the plies facing each other, as shown most clearly in Figure 3. Use is made of a ply of suitable material such as sized cotton, or any other preferred material, to constitute a filler piece 12. This filler piece is substantially flat and is smaller in size than the size of the plies 10 and 11. The filler piece 12 is laid opposite the ply 11 in the present instance. Use is made of a piece of woven material such as buckram 13, or any other suitable material may be used. This piece of material 13, which is substantially of the same size as the plies 10 and 11, constitutes a retaining means for retaining the filler piece 12 in place. The piece of material 13 is laid beneath the filler piece 12, as shown in Figure 3. In the present instance the several plies of material mentioned are circular in shape and of a size to produce a comparatively large powder puff. This type of powder puff usually is provided with a band, such as the band 14, which is stitched to the other plies in the one operation of stitching. The stitching is carried out by a suitable machine for that purpose and occurs along the marginal edges of the several plies which will include the plies 10, 11, and 13, so that said plies will be stitched together as at S. All but a portion of the plies are stitched, as shown at 15 in Figures 1 to 4, inclusive. By having a portion of the plies unstitched it is possible to turn the plies 10 and 11 so that their right sides respectively will be at the outside, as shown in Figures 4 and 5 after which the stitching of the plies will be completed. It is to be noted that the ply 13 is contiguous and attached to the ply 11 and that the filler piece 12 is disposed beween the ply 13 and the ply 11. The fact that the ply 13 is of comparatively thin material no appreciable thickness is added to the thickness of the complete article. It will also be noted that when the plies 10 and 11 are reversed to bring their right sides, that is to say, their sides with the pile thereon, on the outside there will be marginal portions of the plies 10, 11, and 13 turned inwardly, as shown most clearly at one side of Figure 4. The plies 10 and 11 in fact constitute walls for the powder puff between which the filler piece 12 will be disposed. The marginal edge of the filler piece 12 will abut the inturned portions of the plies 10, 11, and 13, and said filler piece is of such thickness as to maintain the plies 10 and 11 substantially parallel.

From the foregoing it will be apparent that there has been described a powder puff in which use is made of a filler piece or ply which is retained in place without the same being stitched in any manner; that the walls of the powder puff will be maintained in parallel relationship; that the marginal seam will not be unnecessarily bulky or of greater thickness than the central portion of the powder puff; and that the powder puff will have the desired flexibility.

It is to be understood that the embodiment of the invention is shown by way of example and that the choice of materials to be used is optional since the invention resides primarily in the use of a filler which is retained in place without stitching.

What I claim is—

1. A powder puff characterized by a substantially flat filler between the walls of the powder puff, and means extending substantially parallel to said walls and the filler for retaining the filler in place and the walls from collapsing toward each other from a substantially parallel relationship.

2. In a powder puff, a flat filler, a piece of material sewed to portions of the walls of the powder puff which holds the filler flat between the opposite walls of the powder puff, the filler arranged between the piece of material and one of said walls, said filler thus held serving to retain said opposite walls from collapsing toward each other from a substantially parallel relationship.

3. In a powder puff, a filler adapted to lie flat between the opposite walls of the powder puff, and a piece of material sewed along its marginal edge to portions of the walls holding the filler in place.

4. In a powder puff, a filler adapted to lie flat between the opposite walls of the powder puff, and a piece of woven fabric attached to portions of the walls holding the filler in place.

5. A powder puff comprising four plies of material laid against each other, three of said plies being sewed together along their marginal edges, and one of said plies being retained in place by two of the other sewed plies.

6. A powder puff characterized by two powder receiving walls connected together by a marginal seam disposed between said walls, a retaining piece of woven material substantially equal in size and shape to said walls and attached thereto along its marginal edge, and a filler between said retaining piece and one of said walls, said filler being of flexible material and of a thickness substantially equal to the combined thickness of the marginal portions of said walls constituting the seam.

JOSEPH J. COSIN.